(12) United States Patent
Jung

(10) Patent No.: US 10,310,311 B2
(45) Date of Patent: *Jun. 4, 2019

(54) DISPLAY APPARATUS

(71) Applicant: Samsung Electronics Co., Ltd., Suwon-si (KR)

(72) Inventor: Sung Soo Jung, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/321,440

(22) PCT Filed: Jun. 22, 2015

(86) PCT No.: PCT/KR2015/006295
§ 371 (c)(1),
(2) Date: Dec. 22, 2016

(87) PCT Pub. No.: WO2015/199393
PCT Pub. Date: Dec. 30, 2015

(65) Prior Publication Data
US 2017/0205658 A1    Jul. 20, 2017

(30) Foreign Application Priority Data
Jun. 24, 2014   (KR) .................. 10-2014-0077500

(51) Int. Cl.
*G06F 1/16*   (2006.01)
*G02F 1/1333*   (2006.01)
*H04N 5/64*   (2006.01)

(52) U.S. Cl.
CPC .. *G02F 1/133308* (2013.01); *G02F 1/133305* (2013.01); *G06F 1/1601* (2013.01);
(Continued)

(58) Field of Classification Search
CPC ..................................................... G06F 1/1652
See application file for complete search history.

(56) References Cited

U.S. PATENT DOCUMENTS 7,209,195 B2 *   4/2007   Lin ................... G02F 1/133308
                                                                349/58
9,727,080 B2 *   8/2017   Jung ..................... G06F 1/1601
(Continued)

FOREIGN PATENT DOCUMENTS

JP   2005-331872   12/2005
JP   2006-23676   1/2006
(Continued)

OTHER PUBLICATIONS

International Search Report dated Sep. 24, 2015, in corresponding International Application No. PCT/KR2015/006295.
(Continued)

*Primary Examiner* — Adrian S Wilson
(74) *Attorney, Agent, or Firm* — Staas & Halsey LLP (57) ABSTRACT

A display apparatus including a display module that is deformable to be in a flat surface state or in a curved surface state. The display module includes a bottom chassis forming the display module, and the bottom chassis includes a rear panel forming a rear surface of the bottom chassis and one pair of side frames forming both side surfaces of the bottom chassis and allowing both side ends of the rear panel to be movably installed thereon, so that the rear panel is movable with respect to the side frames according to deformation of the display module, thereby enabling easy deformation of the display module.

15 Claims, 6 Drawing Sheets

(52) U.S. Cl.
CPC ............. *G06F 1/1652* (2013.01); *H04N 5/64* (2013.01); *G02F 2001/13332* (2013.01); *G02F 2001/133314* (2013.01)

(56) References Cited

U.S. PATENT DOCUMENTS

| | | | | |
|---|---|---|---|---|
| 9,843,758 | B2* | 12/2017 | Park | H04N 5/4403 |
| 10,004,151 | B2* | 6/2018 | Jung | G06F 1/1601 |
| 2006/0098153 | A1* | 5/2006 | Slikkerveer | G02F 1/133305 349/187 |
| 2008/0024695 | A1* | 1/2008 | Yan | G02F 1/133308 349/58 |
| 2010/0067185 | A1* | 3/2010 | Liou | F16M 13/02 361/679.21 |
| 2011/0043976 | A1* | 2/2011 | Visser | G09F 9/00 361/679.01 |
| 2013/0070407 | A1* | 3/2013 | Wang | G06F 1/1637 361/679.26 |
| 2013/0083496 | A1* | 4/2013 | Franklin | G06F 1/1626 361/749 |
| 2013/0155655 | A1* | 6/2013 | Lee | H05K 5/03 362/97.1 |
| 2013/0207946 | A1* | 8/2013 | Kim | G09G 3/3225 345/204 |
| 2013/0258702 | A1 | 10/2013 | Kim | |
| 2014/0009914 | A1 | 1/2014 | Cho et al. | |
| 2014/0045283 | A1* | 2/2014 | Hirakata | H01L 51/56 438/22 |
| 2014/0140023 | A1 | 5/2014 | Lee et al. | |
| 2014/0198465 | A1* | 7/2014 | Park | H05K 5/0226 361/749 |
| 2015/0035812 | A1* | 2/2015 | Shin | G09G 3/3688 345/204 |
| 2016/0088743 | A1* | 3/2016 | Zhang | G06F 1/1601 361/679.01 |
| 2016/0295176 | A1* | 10/2016 | Jeong | G09G 3/00 |
| 2017/0295655 | A1* | 10/2017 | Jung | H05K 5/0017 |

FOREIGN PATENT DOCUMENTS

| | | |
|---|---|---|
| KR | 10-2012-0118372 | 10/2012 |
| KR | 10-2013-0050794 | 5/2013 |

OTHER PUBLICATIONS

Extended European Search Report dated Jan. 30, 2018 in European Patent Application No. 15811216.9.
European Communication dated Aug. 15, 2018 in European Patent Application No. 15811216.9.

* cited by examiner

DISPLAY APPARATUS

CROSS-REFERENCE TO RELATED APPLICATIONS

This application is a U.S. National Stage Application, which claims the benefit under 35 U.S.C. § 371 of PCT International Patent Application No. PCT/KR2015/006295, filed Jun. 22, 2015, which claims the foreign priority benefit under 35 U.S.C. § 119 of Korean Patent Application No. 10-2014-0077500, filed Jun. 24, 2014, the contents of which are incorporated herein by reference.

TECHNICAL FIELD

Disclosed is a display apparatus provided with a display module that is used in a flat surface state or a curved surface state.

BACKGROUND ART

In general, a display apparatus is provided with a display module on which an image is display, and types of the display apparatus include a television and a monitor.

The recent development of the display apparatus is progressing in such a way that a display module having maintained a flat surface state during a general use is deformed to be in a curved surface state to provide a three-dimensional effect even through a two-dimensional image.

DISCLOSURE

Technical Problem

The present invention provides a display apparatus which can be easily deformable to be in a flat surface state or a curved surface state.

Technical Solution

According to an aspect of the present invention, there is provided a display apparatus including a display module. The display module may include a display panel on which an image is displayed, a top chassis provided at a front of the display panel, and a bottom chassis provided at a rear of the display panel. The bottom chassis may include a rear panel forming a rear surface of the bottom chassis and one pair of side frames forming both side surfaces of the bottom chassis and movably supporting both side ends of the rear panel. The rear panel may be supported by the one pair of side frames so as to be movable in a width direction of the rear panel.

The one pair of side frames may include side guide grooves, respectively, that are extended in upper and lower side directions to correspond to the both side ends of the rear panel, respectively, such that the both side ends of the rear panel are movably accommodated in the side guide grooves, respectively.

The bottom chassis may include: an upper frame forming an upper portion of the bottom chassis and a lower frame forming a lower portion of the bottom chassis; and the upper frame and the lower frame movably supports an upper end and a lower end of the rear panel, respectively.

The upper frame may include: an upper guide groove configured to movably support the upper end of the rear panel; and the lower frame includes a lower guide groovelower guide groove configured to movably support the lower end of the rear panel.

The upper frame and the lower frame each may include a plurality of slits that are extended in upper and lower side directions while laterally spaced apart from each other.

The display apparatus may further include a plurality of insertion members inserted into the upper guide groove and the lower guide groovelower guide groove to support the upper end and the lower end of the rear panel.

Some of the plurality of insertion members may have inverse-U shaped cross sections to be inserted between the upper end of the rear panel and the upper guide groove and the remaining have U shaped cross sections to be inserted between the lower end of the rear panel and the lower guide groove.

The plurality of insertion members may be made of lubricative resin.

The plurality of insertion members may be disposed side by side in a width direction of the bottom chassis to be inserted into the upper guide groove and the lower guide groove.

The display apparatus may further include a driving apparatus configured to deform the display module to be in a flat surface state or in a curved surface state.

According to another aspect of the present invention, there is provided a display apparatus including a display panel. The display panel may be deformable to be in a flat surface state or a curved surface state, wherein the display module may include a display panel on which an image is displayed, a top chassis provided at a front of the display panel, and a bottom chassis provided at a rear of the display panel. The bottom chassis may include a rear panel forming a rear surface of the bottom chassis, an upper frame movably supporting an upper end of the rear panel, and a lower frame movably supporting a lower end of the rear panel.

Advantageous Effects

According to the above-described aspects of the present invention, the display apparatus includes a display module whose bottom chassis includes a rear panel forming a rear surface thereof and side frames forming both side portions thereof and allowing both side ends of the rear panel to be movably installed thereon, so that the display module is easily deformed.

MODE FOR INVENTION

The invention is described more fully hereinafter with reference to the accompanying drawings, in which exemplary embodiments of the invention are shown.

Figure 1:
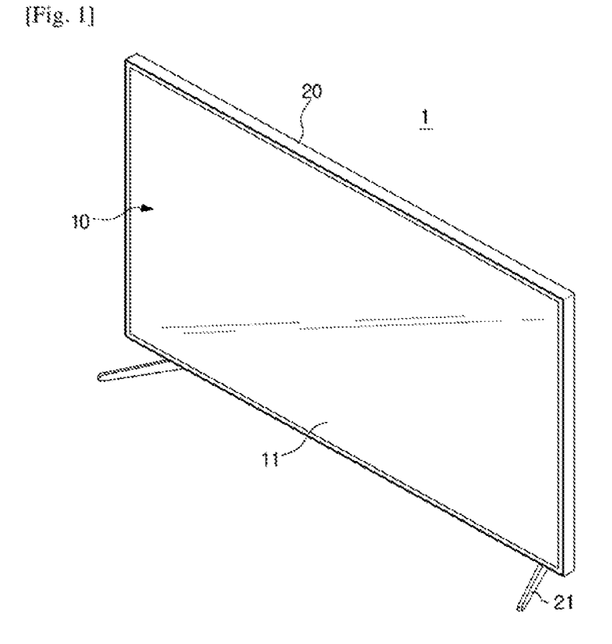
FIG. 1 is a perspective view schematically illustrating a display apparatus according to an embodiment of the present disclosure.
Figure 2:
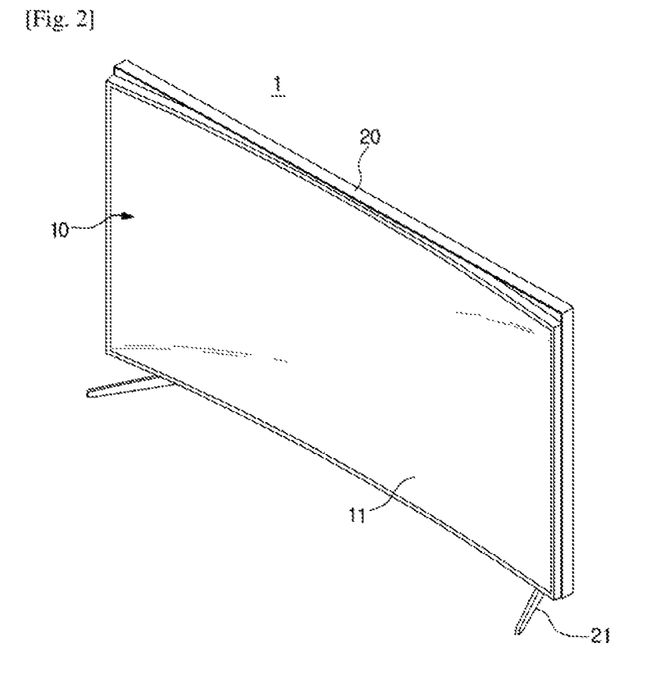
FIG. 2 is a perspective view schematically illustrating a display module of a display apparatus according to an embodiment of the present disclosure, the display module in a curved surface.

Referring to FIGS. 1 and 2, a display apparatus 1 includes a display module 10 to display an image, and the display module 10 is deformable to be in a flat surface state or in a curved surface state.

Figure 3:
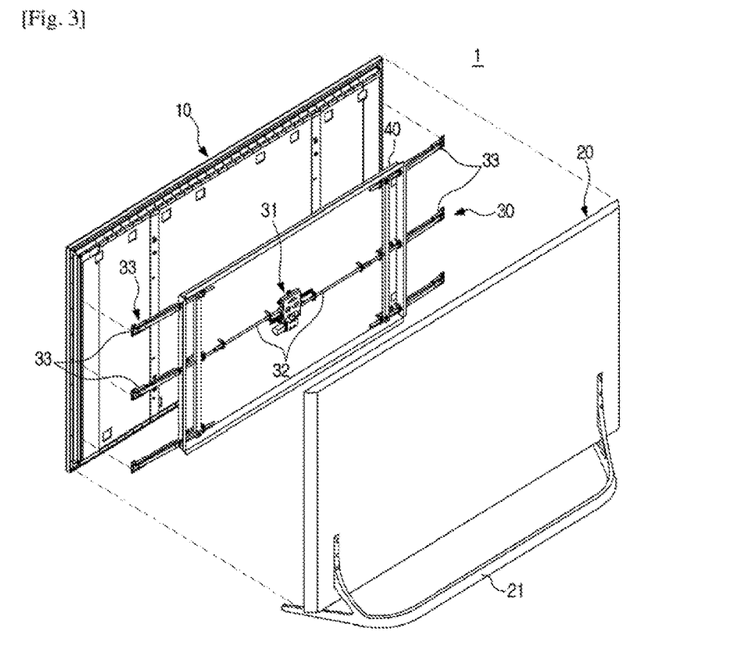
FIG. 3 is an exploded perspective view illustrating a display apparatus according to an embodiment of the present disclosure.

The display apparatus 1 includes the display module 10 to display an image as shown in FIG. 3, and a case 20 to accommodate the display module 10 and various electronic compartments.

The display module 10 according to an embodiment of the present disclosure may be deformable to be in a flat surface state as shown in FIG. 1 or in a curved surface state as shown in FIG. 2 in which both side ends of the display module 10 protrude forward of the center portion of the display module 10.

The case 20 is provided to encase the display module 10 at a rear side of the display module 10. The case 30 may include a stand 21 allowing the display apparatus 1 to stand erect.

Although not shown, the display apparatus 1 may be fixed to a wall through a wall mounting purpose bracket without being installed using the stand 21. The wall mounting bracket may be detachably installed on the base 20, or detachably installed on a base member 40, which will be described later, through the case 20.

Disposed on the base member 40 are a power supply substrate (not shown) to supply power to the display apparatus 1, a signal processing substrate (not shown) for processing various types of images and sound signals, a panel driving substrate (not shown) for controlling operation of a display panel 11 which will be described later, and a timing control substrate (not shown) for transmitting an image signal to the display panel 11.

Although the substrates according to the embodiment of the present disclosure are installed on the base member 40, the present disclosure is not limited thereto. For example, the substrates may be installed at an inner side of the case 20. Alternatively, the substrates may be provided as a module in a control box, and installed at a rear surface of the case 20 separately from the stand 21 or the display apparatus 1.

The display apparatus 1 includes a driving apparatus 30 provided between the display module 10 and the case 20 to deform the display module 10 to be in a flat surface state or a curved surface state.

The driving apparatus 30 includes a driving unit 31 generating power, a plurality of moving members 32 having one ends thereof connected to the driving unit 31 to receive power from the driving unit 31 and to move laterally in a width direction of the display module, and a plurality of rotation members 33 rotatably installed at the other ends of the plurality of moving members 32 to rotate according to movement of the moving members 32.

In order to support the driving apparatus 30 and the center portion of the display module 10, the base member 40 is disposed at a rear of the display module 10. The driving apparatus 30 is installed at a rear surface of the base member 40, and an end of the center portion of the display module 10 is fixed to the base member 40.

Although the driving apparatus 30 according to an embodiment of the present disclosure is disposed at rear of the base member 40, the present disclosure is not limited thereto. For example, the driving unit 31 may be fixed to a front surface of the base member 40.

Accordingly, when the moving members 32 receive power of the driving unit 31 through the one ends thereof, and move laterally in the width direction of the display module 10, and the rotation members 33 connected to the other ends of the moving members 32 rotate on the other ends of the moving members 32 such that both side ends of the display module 10 are moved in front and rear side directions. Since the center portion of the display module 10 is fixed to the base member 40, the display module 10 is deformed to be in a flat surface state or a curved surface state as the both side ends move in the front and rear side directions.

Figure 4:
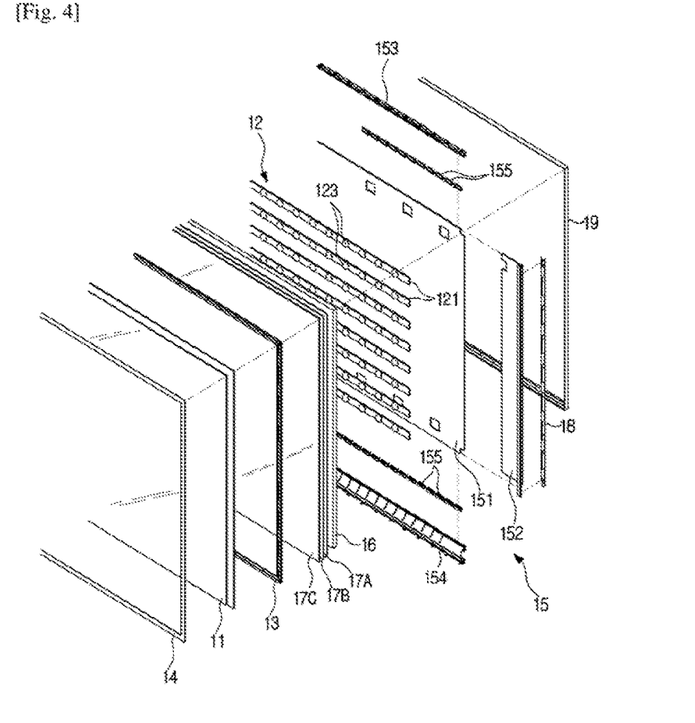
FIG. 4 is an exploded perspective view illustrating a display module applied to a display apparatus according to an embodiment of the present disclosure.
Figure 5:
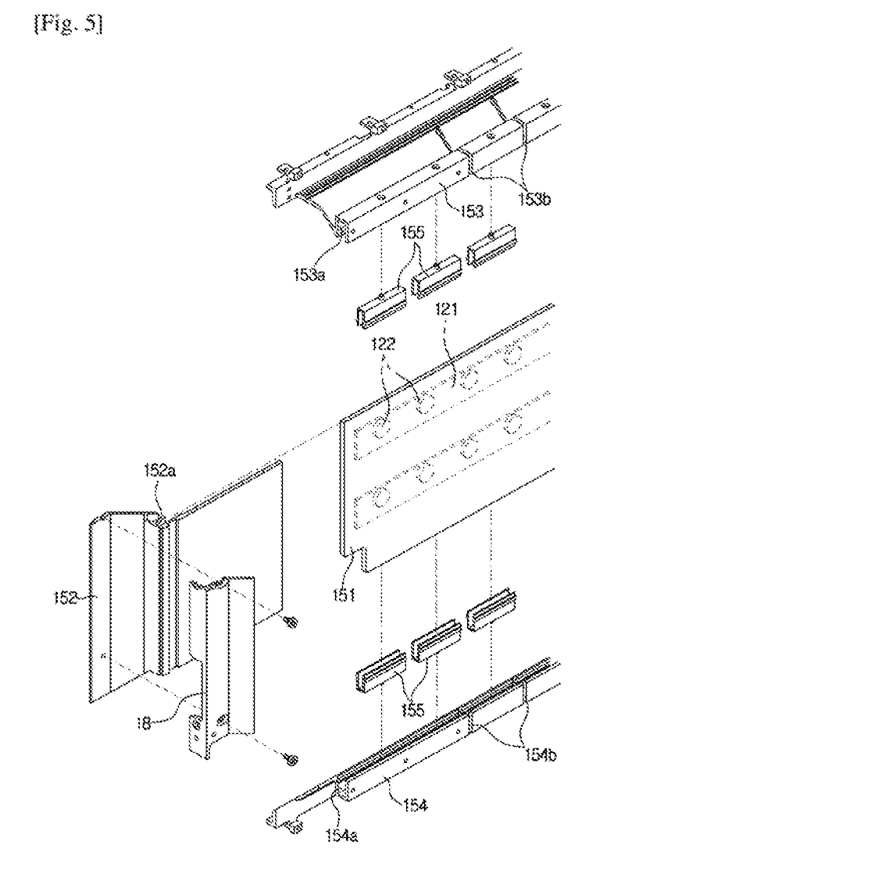
FIG. 5 is a partial exploded perspective view illustrating a bottom chassis applied to a display apparatus according to an embodiment of the present disclosure.
Figure 6:
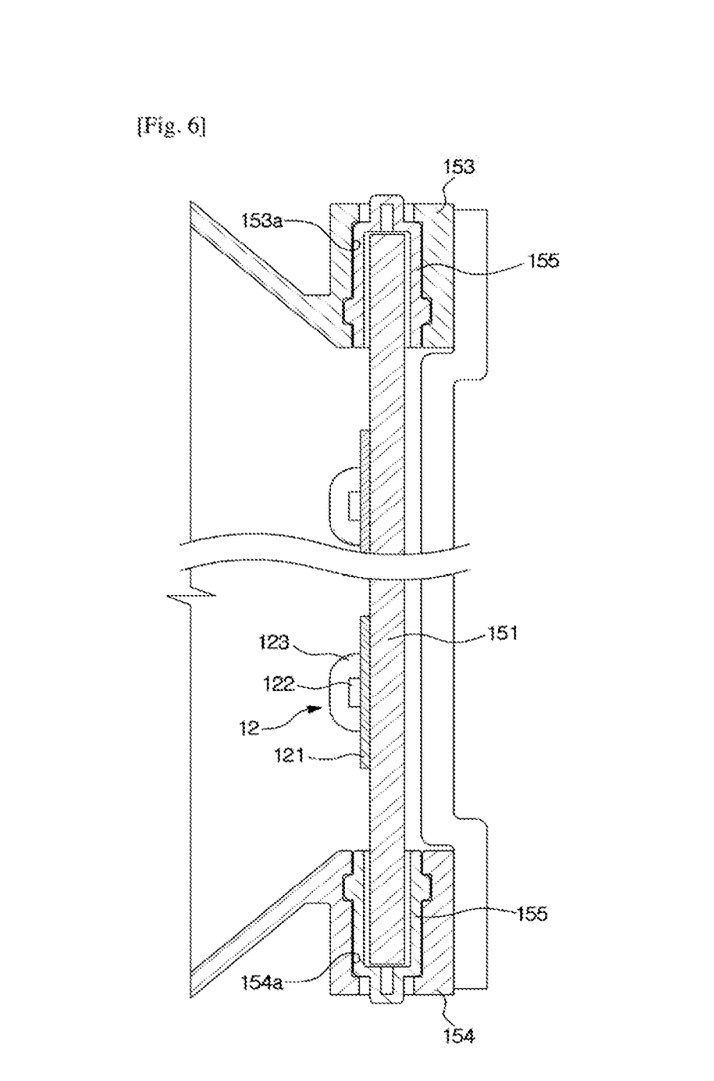
FIG. 6 is a side-sectional view illustrating an installed state of a rear panel, an upper frame and a lower frame of a bottom chassis that are applied to a display apparatus according to an embodiment of the present disclosure.
Figure 7:
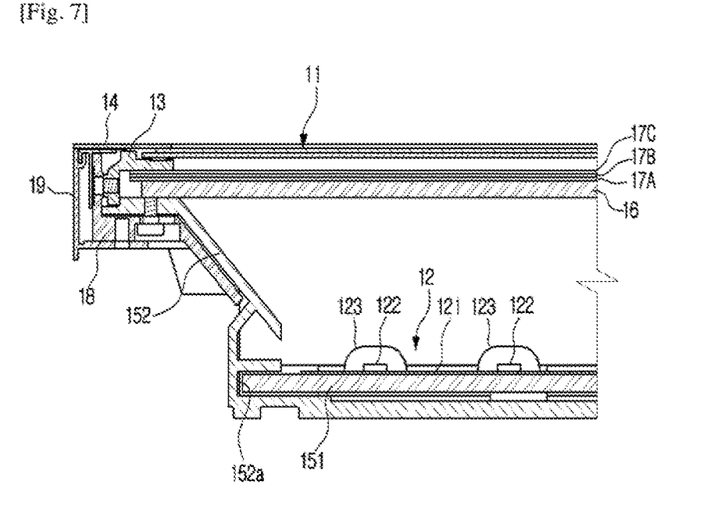
FIG. 7 is a cross-sectional view illustrating a display module applied to a display apparatus according to an embodiment of the present disclosure, the display module in a flat surface state.

Referring to FIGS. 4 to 6, the display module 10 includes the display panel 11 forming of a liquid crystal panel, a middle mold 13 supporting the display panel 11, a backlight 12 disposed at a rear of the display panel 11 to supply light to the display panel 11, a top chassis 14 coupled to a front side of the middle mold 13 such that the display panel 11 is kept installed on the middle mold 13, a bottom chassis 15 coupled to a rear side of the middle mold 13 while accommodating the backlight 12 such that the backlight 12 is kept installed at a rear of the display panel 11, one pair of fixing frames 18 configured to fix side frames 152 of the bottom chassis 15 to the middle mold 13, which will be described later, and a support frame 19 provided in the form of a quadrangular ring and coupled to a rear side of the periphery of the top chassis 14 to support the fixing frames 18 and an upper frame 153 and a lower frame 154 which will be described later.

In addition, the display module 10 includes a diffusion plate 16 that is provided in the form of a flat panel and disposed between the display panel 11 and the backlight 12 to diffuse light supplied from the backlight 12. Disposed at a front of the diffusion panel 16 are a diffusion sheet 17A diffusing light that has passed through the diffusion plate 16 again, a prism sheet 17B disposed at a front of the diffusion sheet 17A and including a prism pattern to focus light diffused from the diffusion sheet 17A in a direction perpendicular to the display panel 11, and a protection sheet 17C disposed at a front of the prism sheet 17B to protect the prism sheet 17B.

The backlight 12 is provided in the form of a bar that extends in a width direction of the bottom chassis 15, and includes a plurality of substrates 121 disposed on the bottom chassis 15 while spaced apart from each other in upper and lower side directions, a plurality of light emitting diodes (122 in FIG. 6) installed on the substrates 121, respectively, to emit light, and lenses 123 installed on the light emitting diodes 122, respectively, to collect light generated from the light diodes 122.

Since the display module 10, which uses a liquid crystal panel as the display panel 11, includes the backlight 12 to supply light to the display panel 11, the thickness of the display module 10 is increased by the thickness of the backlight 12.

When the display module 10 is deformed to be in a curved surface state, the curvature of the top chassis 14 forming the front side of the display module 10 needs to become smaller than that of the bottom chassis 15 forming the rear side of the display module 10.

In order to enable easy deformation of the display module 10, the bottom chassis 15 includes a rear panel 151 forming a rear surface of the bottom chassis 15, and one pair of side frames 152 forming both side surfaces of the bottom chassis 15, an upper frame 153 and a lower frame 154 forming an upper side and a lower side of the bottom chassis 15, respectively.

The rear panel 151 is provided in the form of a quadrangular panel, and on the rear panel 151, the substrates 121 of the backlight 12 are disposed while spaced apart from each other in upper and lower side directions.

The side frames 152 extend in the upper and lower side directions to correspond to both side ends of the rear panel 151. The side frames 152 include side guide grooves 152a on which both side ends of the rear panel 151 are installed, respectively, so as to be movable in the width direction of the bottom chassis 15.

Figure 8:
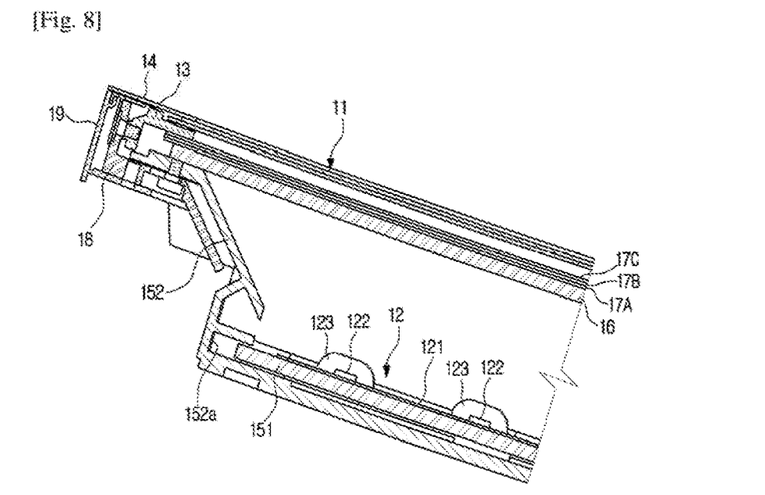
FIG. 8 is a cross-sectional view illustrating a display module applied to a display apparatus according to an embodiment of the present disclosure, the display module in a curved surface state.

Accordingly, the both side ends of the rear end 151 in a flat surface state of the display module 10 are provided in the side guide grooves 152a, and when the display module 10 is deformed to be in a curved surface state, the both side ends of the rear panel 151 move to the outside of the side guide grooves 152a as shown in FIG. 8. The display panel 11 forming the front surface of the display module 10 and the rear panel 151 forming the rear surface of the display module 10 are easily bent to have respective different curvatures.

The upper frame 153 and the lower frame 154 extend in the width direction of the bottom chassis 15 to correspond to the upper end and the lower end of the rear panel 151. The upper frame 153 has an upper guide groove 153a on which the upper end of the rear panel 151 is installed so as to be movable in the width direction of the bottom chassis 15, and the lower frame 154 has a lower guide groovelower guide groove 154a on which the lower end of the rear panel 151 is installed so as to be movable in the width direction of the bottom chassis 15.

In addition, the upper frame 153 and the lower frame 154 each include a plurality of slits 153b and 154b to enable easy deformation of the display module 10. The plurality of slits 153b extend in the upper side directions on the upper frame 153 while spaced apart from each other in the left and right side directions, and the plurality of slits 154b extend in the lower side directions on the lower frame 154 while spaced apart from each other in the left and right side directions.

Figure 9:
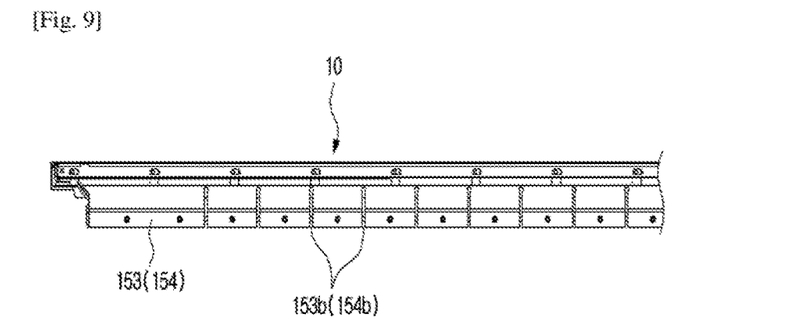
FIG. 9 is a plan view illustrating a display module applied to a display apparatus according to an embodiment of the present disclosure, the display module in a flat surface state.
Figure 10:
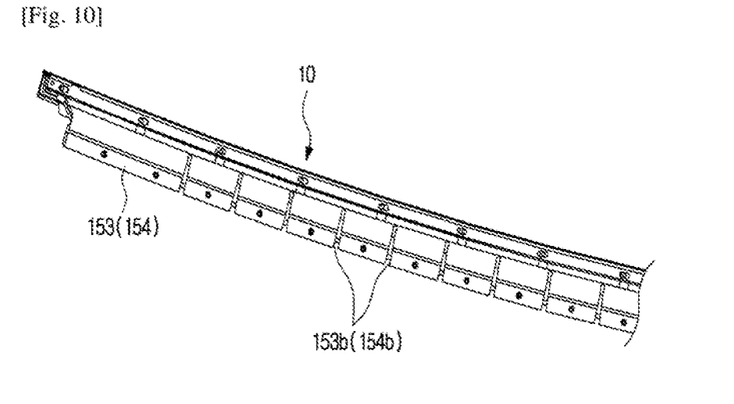
FIG. 10 is a plan view illustrating a display module applied to a display apparatus according to an embodiment of the present disclosure, the display module in a curved surface state.

Accordingly, the slits 153b and 154b each maintain a predetermined width in a flat surface state of the display module 10 as shown in FIG. 9, and when the display module 10 is deformed to be in a curved surface state by the driving apparatus 30, the slits 153s and 154b are opened to have rear side widths thereof become larger than front side widths thereof, thereby enabling easy deformation of the display module 10.

In addition, insertion members 155 formed of lubricative resin are installed into the upper guide groove 153a and the lower guide groovelower guide groove 154a so as to enable easy movement of the rear panel 151, in which the insertion members 155 movably support the upper end and lower end of the rear panel 151 relative to the upper frame 153 and the lower frame 154. According to an embodiment of the present disclosure, some of the insertion members 155 have inverse-U shaped cross sections to be installed in the upper guide groove 153a, and the remaining have U shaped cross sections to be installed in the lower guide groovelower guide groove 154a.

According to an embodiment of the present disclosure, the upper guide groove 153a and the lower guide groovelower guide groove 154a have the plurality of insertion members 155 disposed while spaced apart from each other in the width direction of the display module 10. Accordingly, the upper frame 153 and the lower frame 154 are prevented from being insufficiently deformed due to the insertion members 155 inserted into the upper guide groove 153a and the lower guide groovelower guide groove 154a.

Although the insertion members 155 according to an embodiment of the present disclosure are provided in plural, the present disclosure is not limited thereto. For example, the upper guide groove 153a and the lower guide groovelower guide groove 154a each may have only one insertion member 155 formed of material that is easily deformable.

According to an embodiment of the present disclosure, the side frames 152 have the side guide grooves 152a, the upper frame 153 has the upper guide groove 153a, and the lower frame 154 has the lower guide groovelower guide groove 154a. However, the present disclosure is not limited thereto. For example, the side guide grooves 152a may be provided in the side frames 152 and the upper guide groove 153a and the lower guide groovelower guide groove 154a may be omitted. Alternatively, the upper guide groove 153a and the lower guide groovelower guide groove 154a may be provided in the upper frame 153 and the lower frame 154, respectively, and the side guide grooves 152a may be omitted.

The display apparatus 1 according to the disclosed embodiments includes a control unit (not shown) to control the driving apparatus 30 and buttons (not shown) provided on a remote controller or the display apparatus, so that the display module 10 is deformed to be in one of a flat surface state and a curved surface state according to manipulation of the buttons.

Alternatively, the display module 10 may be deformed to be in one of a flat surface state and a curved surface state by the driving apparatus 30 in an automatic manner depending on the types of contents to be displayed on the display module 10.

For example, when information indicating that a content to be displayed on the display module 10 is a news content is input to the display apparatus 1, the display module 10 is deformed by the driving apparatus 1 to be in a flat surface state and when information indicating that a content to be displayed on the display module 10 is a movie content is input to the display apparatus 1, the display module 10 is deformed by the driving apparatus 1 to be in a curved surface state.

The information about the type of contents may be directed input by a user through the buttons, or may be transmitted together with an image signal from an image transmitter of a broadcasting station.

Although the display module according to the embodiment of the present disclosure is deformed to be in one of a flat surface state and a curved surface state with a predetermined curvature, the present disclosure is not limited thereto. For example, the curvature of the display module 10 may be continuously deformed within a predetermined range of curvature or may be deformed by stages. That is, when a user presses a button, the curvature of the display module 10 may be continuously deformed in proportional to the time for which the button is pressed, or may be deformed by stages in proportional to the number of times by which the button is pressed.

Although the display module 10 according to the embodiment of the present disclosure has the entire area thereof deformed to have a predetermined curvature, the present disclosure is not limited thereto. Depending on designs of the display module, only the central portion of the display module may be deformed while keeping both side ends thereof in flat surface states, or the display module may have the central portion and the both side ends deformed with different curvatures.

Although the backlight 12 of the display module 10 according to the embodiment of the present disclosure includes the substrates 121 disposed at a rear of the display panel 1 and the plurality of light emitting diodes 122 installed on the substrates 121, the present disclosure is not limited thereto. For example, the backlight 12 may include a light guide plate disposed at a rear of the display panel, substrates while facing both side ends of the light guide plate, and a plurality of light emitting diodes installed on the substrates.

Although a few embodiments of the present disclosure have been shown and described, it would be appreciated by those skilled in the art that changes may be made in these embodiments without departing from the principles and spirit of the disclosure, the scope of which is defined in the claims and their equivalents.

The invention claimed is:

1. A display apparatus comprising:
a display module deformable between a flat surface state and a curved surface state including a flexible display panel on which an image is displayed;
a top chassis at a front of the flexible display panel; and
a bottom chassis at a rear of the flexible display panel, wherein the bottom chassis includes:
a rear panel forming a rear surface of the bottom chassis, and
one pair of side frames forming both side surfaces of the bottom chassis, the one pair of side frames being formed to accommodate both side ends of the rear panel, and
wherein when the display module deforms from the flat surface state to the curved surface state, the one pair of side frames move away from the both side ends of the rear panel, respectively, such that the both side ends of the rear panel are spaced further from the both side surfaces of the bottom chassis than in the flat surface state.

2. The display apparatus of claim 1, wherein the one pair of side frames comprise side guide grooves, respectively, that are extended in upper and lower side directions to correspond to the both side ends of the rear panel, respectively, such that the both side ends of the rear panel are movably accommodated in the side guide grooves, respectively.

3. The display apparatus of claim 2, wherein:
the bottom chassis comprises an upper frame forming an upper portion of the bottom chassis and a lower frame forming a lower portion of the bottom chassis; and
the upper frame and the lower frame movably support an upper end of the rear panel and a lower end of the rear panel, respectively.

4. The display apparatus of claim 3, wherein:
the upper frame includes an upper guide groove configured to movably support the upper end of the rear panel; and
the lower frame includes a lower guide groove configured to movably support the lower end of the rear panel.

5. The display apparatus of claim 4, wherein the upper frame and the lower frame each includes a plurality of slits that are extended in upper and lower side directions while laterally spaced apart from each other.

6. The display apparatus of claim 4, further comprising a plurality of insertion members inserted into the upper guide groove and the lower guide groove to accommodate the upper end of the rear panel and the lower end of the rear panel.

7. The display apparatus of claim 6, wherein some of the plurality of insertion members have inverse-U shaped cross sections to be inserted between the upper end of the rear panel and the upper guide groove and the remaining have U shaped cross sections to be inserted between the lower end of the rear panel and the lower guide groove.

8. The display apparatus of claim 6, wherein the plurality of insertion members are made of lubricative resin.

9. The display apparatus of claim 6, wherein the plurality of insertion members are disposed side by side in a width direction of the bottom chassis to be inserted into the upper guide groove and the lower guide groove.

10. The display apparatus of claim 1, further comprising a driving apparatus configured to deform the display module to be in the flat surface state or in the curved surface state.

11. A display apparatus comprising:
a display panel that is deformable to be in a flat surface state or in a curved surface state, wherein the display panel is included in a display which includes a top chassis at a front of the display panel, and a bottom chassis at a rear of the display panel, the display panel being configured to display an image;
wherein the bottom chassis includes:
a rear panel forming a rear surface of the bottom chassis,
an upper frame having an upper guide groove configured to be formed to accommodate an upper end of the rear panel, and
a lower frame having a lower guide groove configured to be formed to accommodate a lower end of the rear panel.

12. The display apparatus of claim 11, wherein the upper frame and the lower frame each includes a plurality of slits that are extended in upper and lower directions while laterally spaced apart from each other.

13. The display apparatus of claim 11, further comprising a plurality of insertion members that are inserted into the upper guide groove and the lower guide groove to accommodate the upper end and the lower end of the rear panel.

14. The display apparatus of claim 13, wherein some of the plurality of insertion members have inverse U shaped cross sections to be inserted between the upper end of the rear panel and the upper guide groove and the remaining have U shaped cross sections to be inserted between the lower end of the rear panel and the lower guide groove.

15. The display apparatus of claim 13, wherein the plurality of insertion members are made of lubricative resin.

* * * * *